(12) United States Patent
Wentworth

(10) Patent No.: US 10,044,090 B1
(45) Date of Patent: *Aug. 7, 2018

(54) SATELLITE DISH MOUNT DEVICE

(71) Applicant: Imagineering Plus Plus, LLC, San Antonio, TX (US)

(72) Inventor: Stuart H. Wentworth, San Antonio, TX (US)

(73) Assignee: Imagineering Plus Plus, LLC, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,677

(22) Filed: Apr. 2, 2018

Related U.S. Application Data

(63) Continuation of application No. 15/169,587, filed on May 31, 2016, now Pat. No. 9,935,356.

(51) Int. Cl.
*H01Q 1/12* (2006.01)
*F16M 13/02* (2006.01)
*E04D 13/147* (2006.01)

(52) U.S. Cl.
CPC ....... *H01Q 1/1221* (2013.01); *E04D 13/1476* (2013.01); *F16M 13/02* (2013.01)

(58) Field of Classification Search
CPC ... H01Q 1/1221; E04D 13/1476; F16M 13/02
USPC ................................................. 52/27, 58, 30
See application file for complete search history.

(56) References Cited

U.S. PATENT DOCUMENTS

| 4,739,337 | A  | * | 4/1988 | Anderson | ............... | H01Q 3/08 333/261 |
| 8,683,751 | B2 | * | 4/2014 | Stearns | ................... | E04D 13/10 52/58 |
| 2006/0016947 | A1 | * | 1/2006 | Capozzi | ............... | H01Q 1/1221 248/284.1 |
| 2012/0144760 | A1 | * | 6/2012 | Schaefer | .................. | E04C 3/06 52/58 |
| 2012/0233958 | A1 | * | 9/2012 | Stearns | .................. | E04D 13/10 52/708 |
| 2014/0208664 | A1 | * | 7/2014 | Schaefer | .................. | E04C 3/06 52/58 |

* cited by examiner

*Primary Examiner* — Adriana Figueroa
(74) *Attorney, Agent, or Firm* — Temmerman Law Office; Mathew J. Temmerman

(57) ABSTRACT

A satellite dish mount device for mounting a dish base plate of a satellite dish thereon. The satellite dish mount device includes a flashing attached to a rooftop. The flashing includes a cable receiving member. A base mount block assembly is integrated to the flashing and includes a block member and a top base plate adaptable to mount the dish base plate thereon. The top base plate includes a plurality of first extruded fins and a plurality of second extruded fins. A cable riser assembly enables a cable coupled to the satellite dish to pass via the cable receiving member through the rooftop. The cable riser assembly provides a drip curve arrangement to the cable above the rooftop and between the satellite dish and the strain relief fitting member thereby providing water proof protection to the cable riser assembly and to the rooftop.

19 Claims, 10 Drawing Sheets

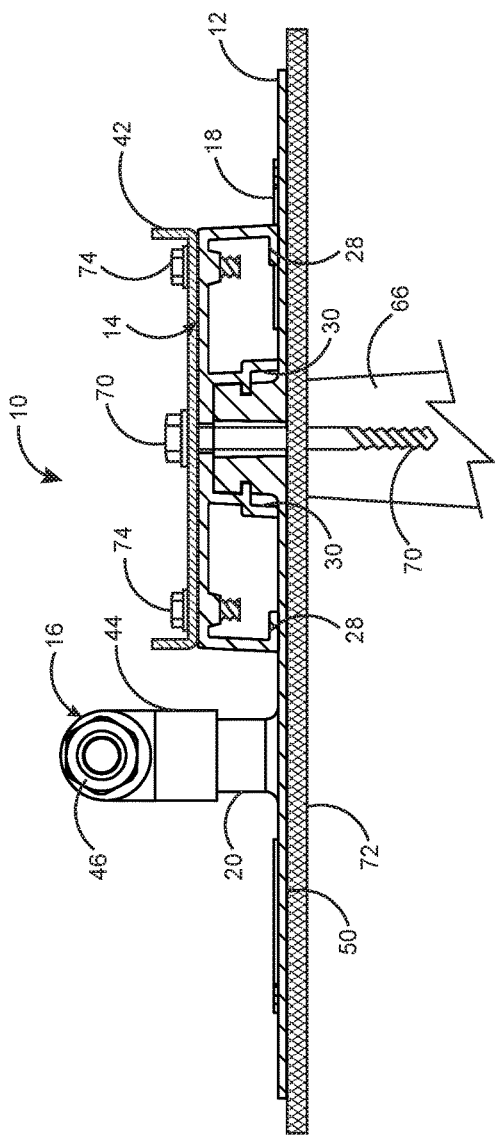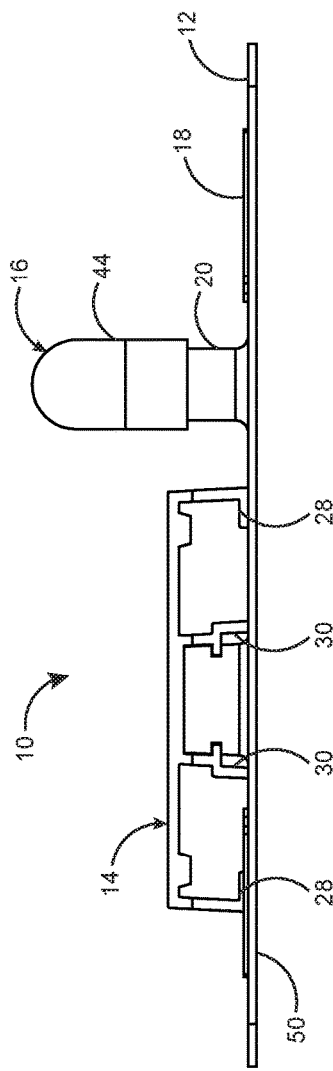

SATELLITE DISH MOUNT DEVICE

RELATED APPLICATIONS

This application is related to and is a continuation of nonprovisional patent application Ser. No. 15/169,587 filed May 31, 2016 and granted on Apr. 3, 2018 as U.S. Pat. No. 9,935,356. The disclosure of that application is incorporated herein as if set out in full.

BACKGROUND OF THE DISCLOSURE

Technical Field of the Disclosure

The present disclosure relates generally to satellite dish mounting devices, and more particularly to a satellite dish mount device having a cable riser assembly to provide a drip curve arrangement to a cable coupled to a satellite dish for preventing water leakage on the cable and at the roof top and further having an integrated flashing that protects the mounting features of the mount from water intrusion through the roofing system.

Description of the Related Art

With the recent advances in the field of digital communication technologies satellite dish systems have seen explosive growth over the past several years. Satellite dish systems are capable of obtaining high quality signals from multiple satellite transmissions. Since the satellite dish receivers are cost effective and easy to maintain, users generally simply mount satellite dish receivers on roof tops or any other unobstructed building spaces of residences or commercial buildings using dish mounting devices. Dish mounting devices firmly attach the satellite dishes to roof tops so the dish can create a line of site communication pathway to an overhead satellite, preferably all without damaging the building to which the dish is mounted.

A wide variety of satellite dish mounting devices have been developed. One such device is designed to secure to a shingled roof or a sidewall structure. This device provides a structure for securing the mounting base of a satellite dish. Another mounting device provides a support stand for a small diameter satellite dish supported by a mast. All of these conventional mounting devices require them to be connected to a roof rafter utilizing several fastening members which can weaken the roof's substrate over time. Most of the existing satellite dish mounting devices are mounted in open areas on the structure which are exposed to rain. Therefore, proper water leakage prevention methods are essential for these mounting devices to prevent rain damage.

Various attempts have been made to remedy the above-mentioned problems. One attempt provides a mounting bracket having several frames for mounting a satellite dish on walls and chimneys. The mounting bracket includes leakage prevention structures. The multiple frames in the bracket increase the overall bulk of the satellite dish mounting assembly.

There is thus a need for a satellite dish mounting device that is small and compact. Such a needed device would be easily mounted on a roof top rather than on walls or chimneys thereby providing more opportunity to have a direct line of sight from the dish to the satellite, and possibly hide the device from view from the ground. Further, such a device would be customizable, to allow it to be mounted on composition roofs. Moreover, such a device would be equipped with a water leakage prevention mechanism to prevent leakage and rain damage. Such a needed device would also require fewer fastening members than existing devices for installation on the roof top. These and other objectives are accomplished by the present invention.

SUMMARY OF THE DISCLOSURE

To minimize the limitations found in the prior art, and to minimize other limitations that will be apparent upon the reading of the specification, the preferred embodiment of the present invention provides a satellite dish mount device to mount a dish base plate of a satellite dish thereon. The satellite dish mount device includes a flashing, a base mount block assembly and a cable riser assembly. A top surface of the flashing includes a plurality of drip diverters and a cable receiving member. A bottom surface of the flashing is attached to a roof top of a building. The base mount block assembly is integral to the top surface of the flashing and includes a top base plate and a block member. The top base plate includes a top base surface and a bottom base surface. The top base plate is designed to mount the dish base plate of the satellite dish at the extruded top base surface. The top base plate includes a plurality of first rafter bolt holes and a plurality of dish holes positioned at the top base surface. The base mount block assembly includes a notch for a course of roofing shingles located at the rooftop.

The top base plate includes a plurality of first extruded fins and a plurality of second extruded fins positioned at the bottom base surface. The dish base plate includes a plurality of dish base holes. The block member includes a plurality of second rafter bolt holes positioned on a top block surface thereon. The plurality of second extruded fins is designed to slide through a groove at the block member thereby engaging the top base plate with the block member. The base mount block assembly attaches to the rooftop by inserting a plurality of rafter bolts through the plurality of first rafter bolt holes aligned with the plurality of second rafter bolt holes at the block member. The dish base plate of the satellite dish is engaged with the top base plate utilizing a plurality of threaded bolts inserted through the plurality of dish holes and the plurality of dish base holes. The base mount block assembly distributes the weight of the dish base plate of the satellite dish to roof substrate on each side of a roof rafter.

The cable riser assembly includes a connecting member and a strain relief fitting member. The connecting member is attached to the cable receiving member and the strain relief fitting member is attached to the connecting member. The strain relief fitting member and the connecting member receive a cable coupled to the satellite dish and pass the cable via the cable receiving member to the rooftop. The cable riser assembly provides a drip curve arrangement to the cable above the rooftop and between the satellite dish and the strain relief fitting member that directs water falling over the cable towards the rooftop without allowing the water to flow through the cable riser assembly. The drip curve arrangement prevents water leakage at the rooftop and at the attic of the building. The drip curve arrangement of the cable prevents the cable from becoming a water pathway from the rooftop to a destination. The plurality of drip diverters diverts water falling on the top surface of the flashing towards the rooftop thereby preventing water leakage at the cable riser assembly and to the attic.

The plurality of first extruded fins and the plurality of second extruded fins distribute the weight of the dish base plate equally over each side of the roof rafter. In one aspect of the present invention, the base mount block assembly disperses the weight of the satellite dish evenly over the rooftop and then directly to the roof rafter thereby providing rigidity to the satellite dish mount device without the need to penetrate into the rooftop where there are no roof rafters. The plurality of first extruded fins and the plurality of second extruded fins enable the base mount block assembly to attach directly to the rooftop.

It is a first objective of the present invention to provide a satellite dish mount device that makes the most of each fastening means to mount a dish base plate of a satellite dish over a rooftop thereby increasing the lifespan of the roofing.

A second objective of the present invention is to provide a satellite dish mount device having a water leakage prevention mechanism to prevent leakage and rain damage.

A third objective of the present invention is to provide a satellite dish mount device that is easily mounted on the rooftop rather than on walls or chimneys thereby providing more opportunity to have a direct line of sight from the dish to the satellite.

A fourth objective of the present invention is to provide a fully retrofit satellite dish mount device that can be mounted on composition roofs.

A further objective of the present invention is to provide a satellite dish mount device that is small and compact.

A still further objective of the present invention is to provide a mounting apparatus that only penetrates the roofing at the structural point of attachment—the rafter—and further utilizes a structural plate that extends the load bearing and outer point attachments by sandwiching the roof sub straight by way of the outer fins and the rafter bolts.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

FIG. 7 is a front cross sectional view of the satellite dish mount device taken along line A-A of FIG. 6;

FIG. 8 is a rear view of the satellite dish mount device according to the preferred embodiment of the present invention;

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
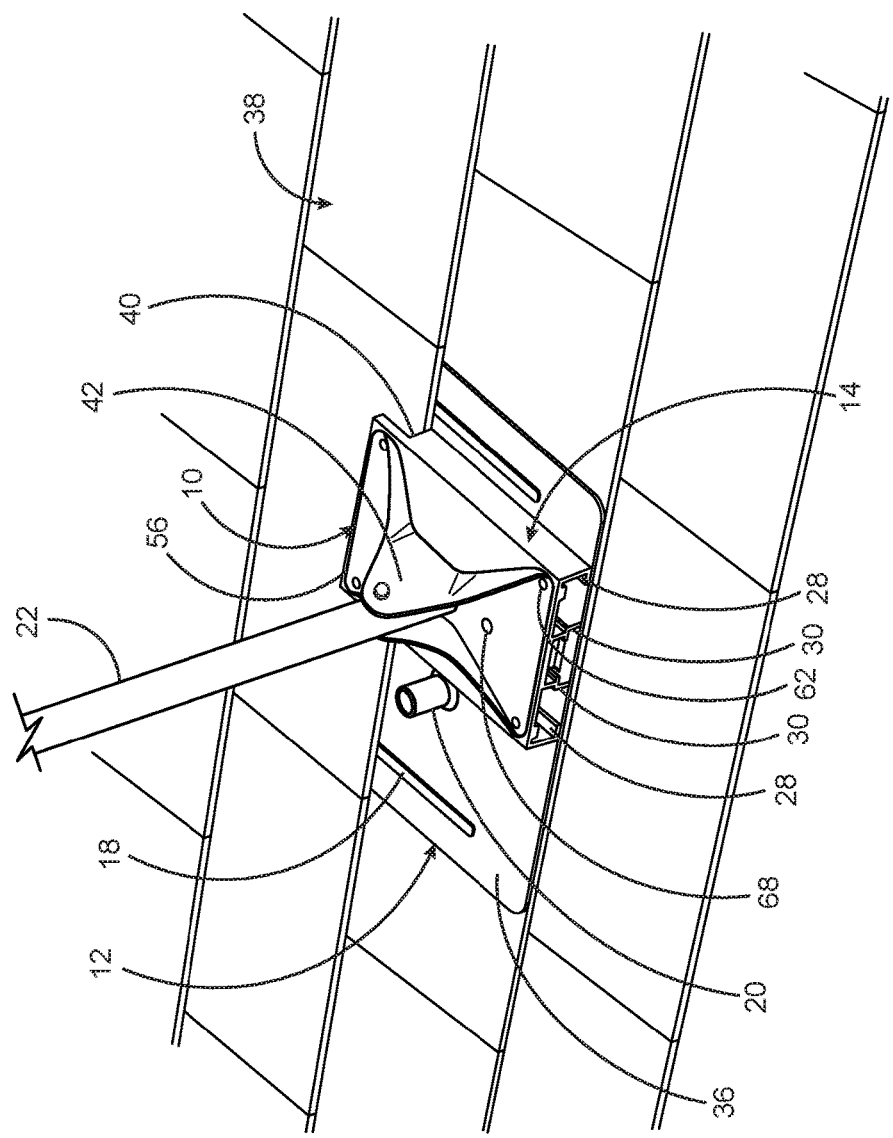
FIG. 1 is a perspective view of a satellite dish mount device in use according to the preferred embodiment of the present invention.
Figure 2:
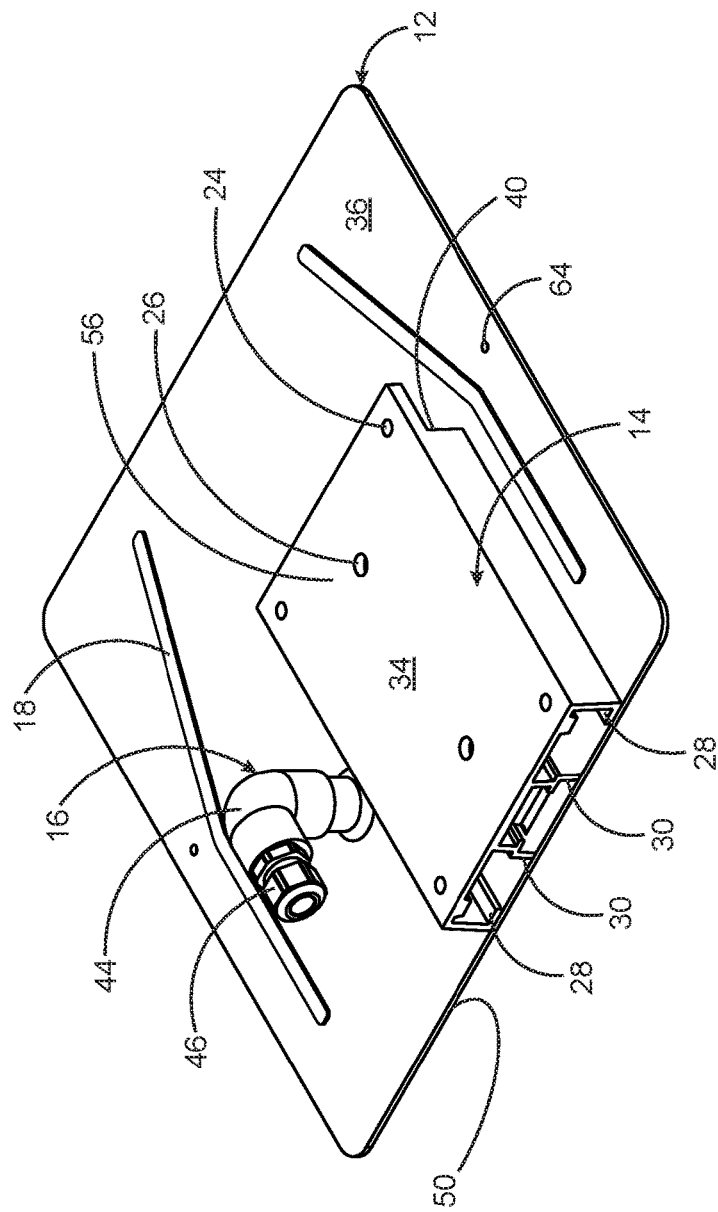
FIG. 2 is a perspective view of the satellite dish mount device, illustrating a cable riser assembly and a base mount block assembly according to the preferred embodiment of the present invention.
Figure 3:
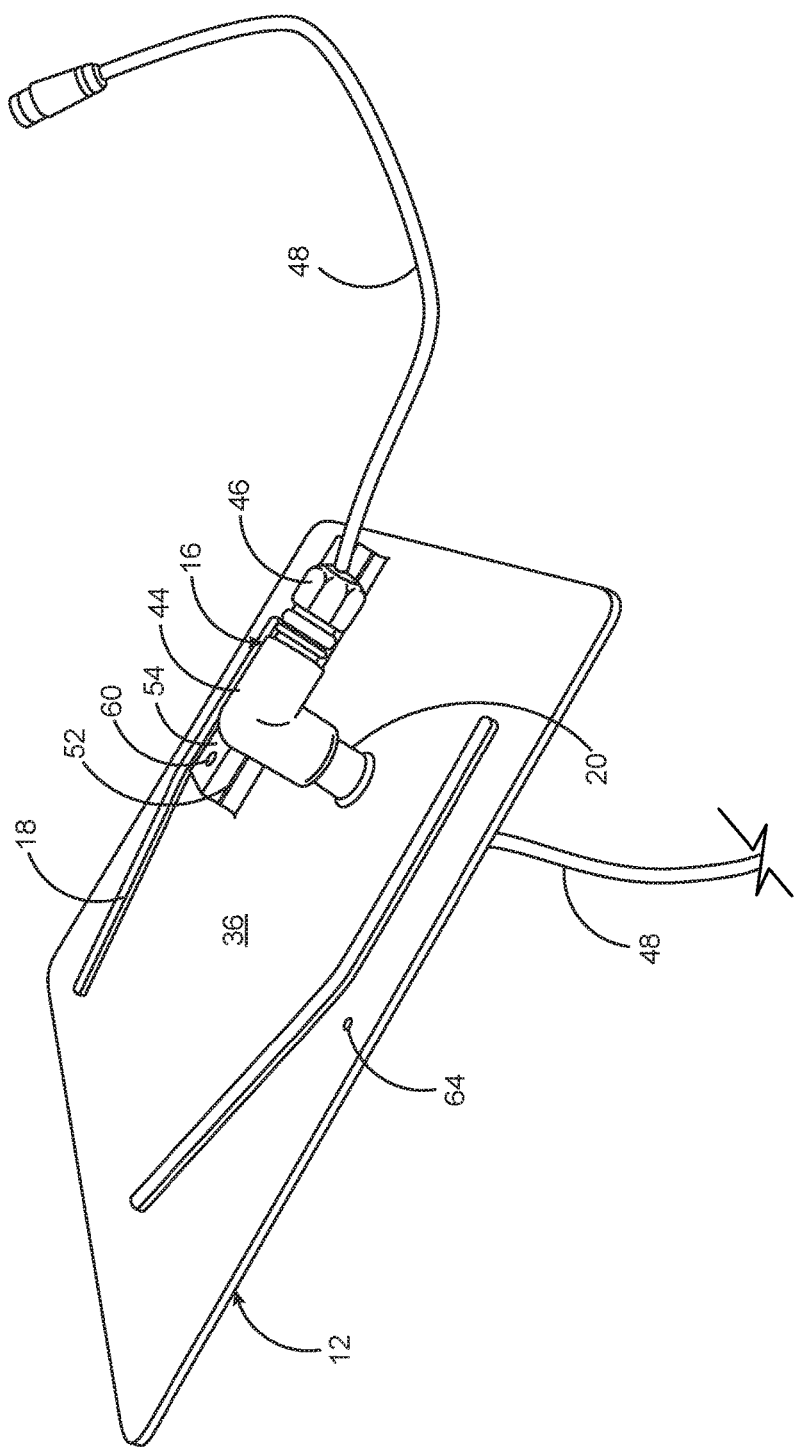
FIG. 3 is a perspective view of the satellite dish mount device, illustrating a cable connected to the cable riser assembly according to the preferred embodiment of the present invention.
Figure 5:
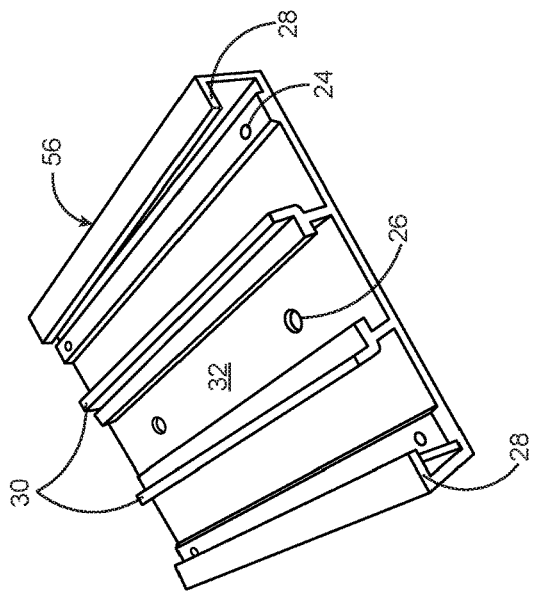
FIG. 5 is a perspective view of a bottom base surface of a top base plate of the satellite dish mount device according to the preferred embodiment of the present invention.
Figure 4:
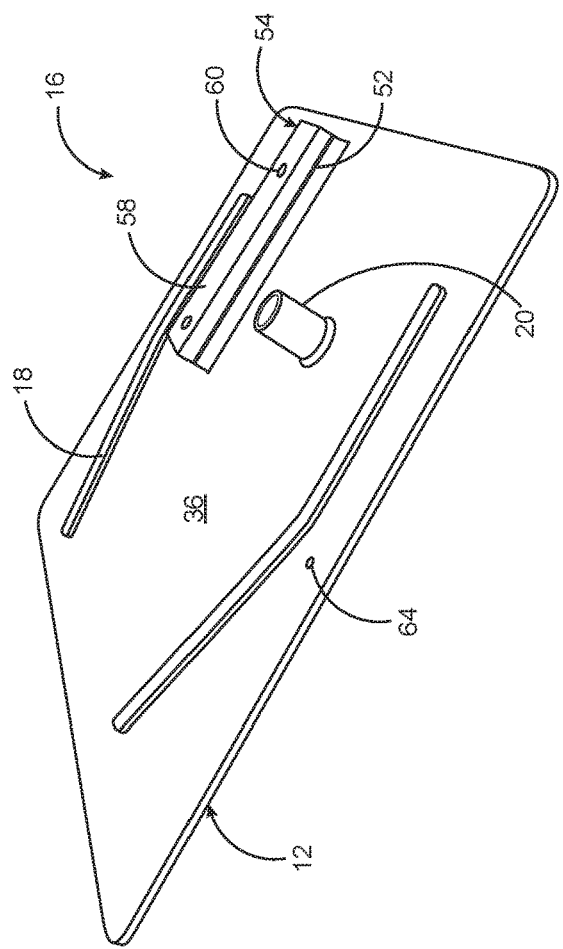
FIG. 4 is a perspective view of a flashing of the satellite dish mount device according to the preferred embodiment of the present invention.

Referring first to FIGS. 1-12B, a satellite dish mount device for mounting a satellite dish according to the present invention is illustrated in different views and generally designated by the reference numeral 10. Referring to FIGS. 1 and 2, the satellite dish mount device 10 includes a flashing 12, a base mount block assembly 14 and a cable riser assembly 16. The flashing 12 includes a top surface 36 and a bottom surface 50. The bottom surface 50 of the flashing 12 is attached to a roof top 38 of a building. The top surface 36 includes a plurality of drip diverters 18 and a cable receiving member 20. The base mount block assembly 14 is integral to the top surface 36 of the flashing 12 and includes a top base plate 56 and a block member 54 (FIGS. 3 and 4). The top base plate 56 includes a top base surface 34 and a bottom base surface 32 (FIG. 5). The top base plate 56 is designed to mount a dish base plate 42 of the satellite dish at the top base surface 34. The extruded top base plate 56 includes a plurality of first rafter bolt holes 26 and a plurality of dish holes 24 positioned at the top base surface 34. The top base plate 56 has an extruded portion that defines a notch 40 for a course of roofing shingles located at the rooftop 38. The flashing 12 includes a plurality of flashing connecting holes 64 to connect the flashing 12 to the rooftop 38.

As shown in FIGS. 1 and 2, the base mount block assembly 14 has a compact design that helps the assembly 14 to firmly mount the dish base plate 42 and an elongated rod 22 extending from the dish base plate 42 on the extruded top base plate 56. The dish base plate 42 of the satellite dish includes a plurality of dish base holes 62. The block member 54 (FIG. 4) includes a plurality of second rafter bolt holes 60 (See FIG. 3) positioned on a top block surface 58 (See FIG. 3) thereon. The base mount block assembly 14 attaches to the rooftop 38 by inserting a plurality of rafter bolts 70 (See FIG. 7) through the plurality of first rafter bolt holes 26 aligned with the plurality of second rafter bolt holes 60 (See FIG. 3) at the block member 54. The dish base plate 42 of the satellite dish is engaged with the top base plate 56 by inserting a plurality of threaded bolts 74 (See FIG. 7) through the plurality of dish holes 24 and the plurality of dish base holes 62. The base mount block assembly 14 distributes the weight of the dish base plate 42 of the satellite dish to roof substrate 72 (See FIG. 7) on each side of a roof rafter 66 (See FIG. 7). Preferably, the base mount block assembly 14 is made of aluminum metal and the flashing 12 is made of polycarbonate material and the plurality of dish holes 24 are tapped machine holes adaptable to provide base stabilization of the base mount block assembly 14.

As shown in FIGS. 2 and 3, the cable riser assembly 16 includes a connecting member 44 and a strain relief fitting member 46. The connecting member 44 is attached to the cable receiving member 20 and the strain relief fitting member 46 is attached to the connecting member 44. The strain relief fitting member 46 and the connecting member 44 receive a cable 48 coupled to the satellite dish and pass the cable 48 via the cable receiving member 20 through the rooftop 38. The cable riser assembly 16 provides a drip curve arrangement to the cable 48 above the rooftop 38 and between the satellite dish and the strain relief fitting member 46 that directs water falling over the cable 48 towards the rooftop 38 (FIG. 1) without allowing the water to flow through the cable riser assembly 16. The drip curve arrangement prevents water leakage at the rooftop 38 (FIG. 1) and at the attic of the building. The drip curve arrangement of the cable 48 prevents cable 48 from acting as a water pathway the rooftop 38 to a destination. In one aspect of the preferred embodiment, the connecting member 44 is attached to the cable receiving member 20 and to the strain relief fitting member 46 utilizing a glue material.

As shown in FIGS. 1-6, the top base plate 56 includes a plurality of first extruded fins 28 and a plurality of second extruded fins 30 positioned at the bottom base surface 32. As shown in FIG. 5, the plurality of first extruded fins 28 and the plurality of second extruded fins 30 distribute the weight of the dish base plate 42 equally over each side of the roof rafter 66 (FIG. 7) and the rooftop 38. The plurality of drip diverters 18 (FIG. 6) diverts water falling on the top surface 36 of the flashing 12 towards the rooftop 38 thereby preventing water leakage at the cable riser assembly 16 and to the attic. In one configuration of the present invention, the plurality of drip diverters 18 is manufactured through a molding process.

Figure 6:
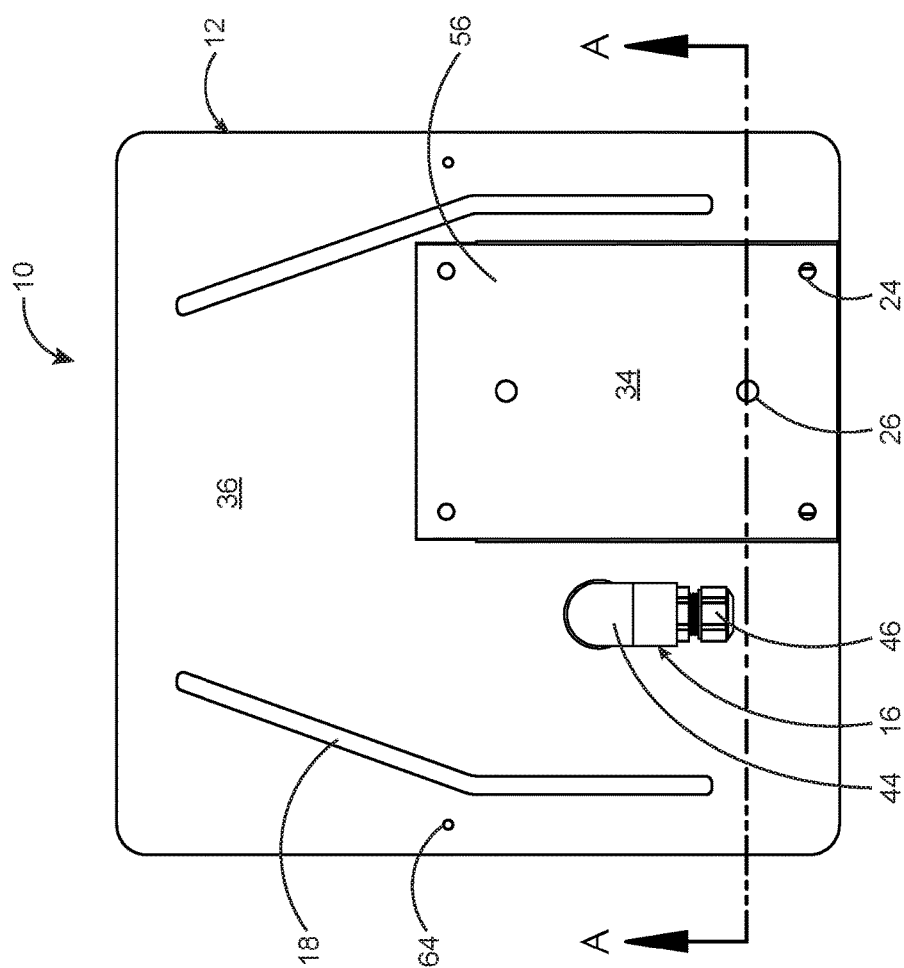
FIG. 6 is a top view of the satellite dish mount device according to the preferred embodiment of the present invention.

FIG. 7 is a cross sectional view of the satellite dish mount device 10 taken along line A-A of FIG. 6. In use, the top base plate 56 is engaged with the block member 54 to create the base mount block assembly 14 by sliding the plurality of second extruded fins 30 through the groove 52 at the block member 54 integrated on the flashing 12. Then, the plurality of rafter bolts 70 is inserted through a plurality of center dish base plate holes 68 (See FIG. 1) of the dish base plate 42 and the plurality of first rafter bolt holes 26 aligned with the plurality of second rafter bolt holes 60 at the block member 54. Thereafter, the dish base plate 42 of the satellite dish is fully engaged with the top base plate 56 by inserting the plurality of threaded bolts 74 through the plurality of dish holes 24 and the plurality of dish base holes 62. Finally, the flashing 12 is engaged with the roofing shingles utilizing the notch 40 at the base mount block assembly 14.

Figure 9:
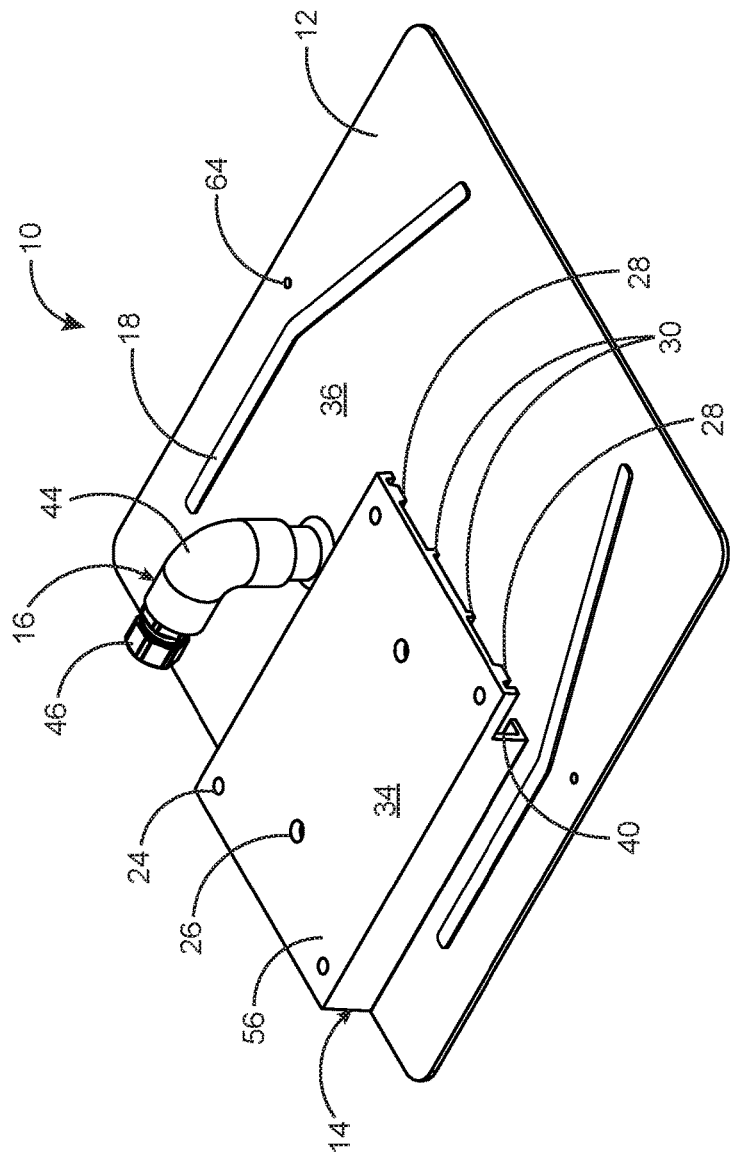
FIG. 9 is a rear perspective view of the satellite dish mount device according to the preferred embodiment of the present invention.
Figure 10:
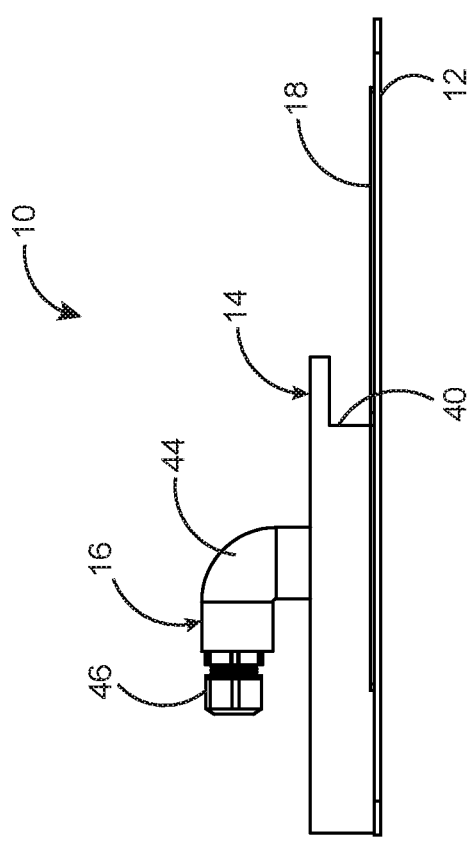
FIG. 10 is a side view of the satellite dish mount device according to the preferred embodiment of the present invention.

Referring to FIGS. 8-10, the base mount block assembly 14 disperses the weight of the satellite dish evenly over the rooftop 38 and then directly to the roof rafter 66 (FIG. 7) thereby providing rigidity to the satellite dish mount device 10 without the need to penetrate into the rooftop 38 where there are no roof rafters. The plurality of first extruded fins 28 and the plurality of second extruded fins 30 enable the base mount block assembly 14 to attach directly to the rooftop 38. An added advantage of the preferred embodiment is that, the satellite dish mount device 10 utilizes a fewer number of roof penetrating fastening means to mount the dish base plate 42 over the rooftop 38 thereby increasing the lifespan of the roof rafter 66. In one configuration, the satellite dish mount device 10 is easily mounted on the rooftop 38 rather than on walls or chimneys thereby providing more opportunity to have a direct line of sight from the dish to the satellite. A further advantage is that, the satellite dish mount device 10 is a fully retrofit product such that the device 10 can be mounted on existing composition roofs.

Figure 11B:
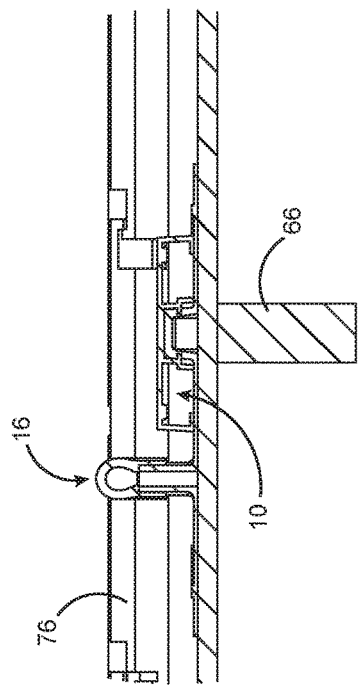
FIG. 11B is a side view of another configuration of the satellite dish mount device shown in FIG. 11A.
Figure 11A:
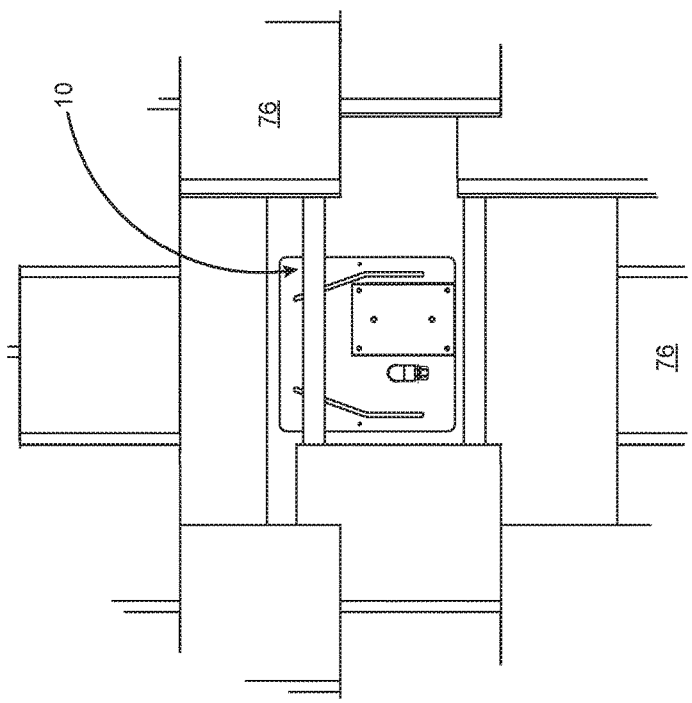
FIG. 11A is a top view of another configuration of the present invention, illustrating the satellite dish mount device mounted on a flat tile roof.

FIGS. 11A and 11B show another configuration of the present invention, illustrating the satellite dish mount device 10 mounted on a flat tile roof 76. The cable riser assembly 16 enables the cable 48 (FIG. 3) coupled to the satellite dish to pass via the cable receiving member 20 (FIG. 1) to the flat tile roof 76.

Figure 12B:
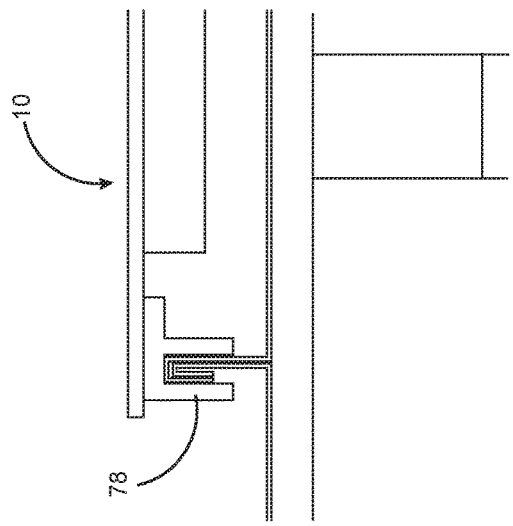
FIGS. 12A and 12B are side views of yet another configuration of the present invention, illustrating the satellite dish mount device mounted on a standing seam roof.
Figure 12A:
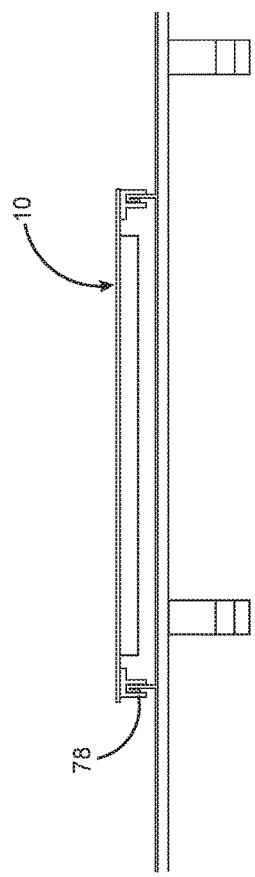

FIGS. 12A and 12B show yet another configuration of the present invention, illustrating the satellite dish mount device 10 mounted on a standing seam roof according to the preferred embodiment of the present invention. In this configuration, the satellite dish mount device 10 utilizes a mounting means, for example, S-5 78 clips to mount the satellite dish mount device 10 on the standing seam roof.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A satellite dish mount for firmly attaching a satellite dish to a roof top and providing a point of entry for a cable, the dish mount comprising:
   a flashing attached to a rooftop, the flashing comprising a cable receiving member for receiving and passing a cable through the rooftop;
   a base mount block assembly integrated to the flashing and including a block member and a top base plate adaptable to mount a dish base plate of a satellite dish thereon, the top base plate including a plurality of fins, a portion of which being designed to slide through a groove at the block member thereby engaging the top base plate with the block member preventing vertical movement of the top base plate relative to the block member; and
   a cable riser assembly having a strain relief fitting member and a connecting member, the cable riser assembly enabling the cable to pass therethrough, and further providing a drip curve arrangement to the cable providing water proof protection to the cable riser assembly and to the rooftop.

2. The satellite dish mount device of claim 1 wherein the drip curve arrangement of the cable directs water falling over the cable towards the rooftop without allowing the water to flow through the cable riser assembly.

3. The satellite dish mount device of claim 1 wherein a portion of the plurality of fins are positioned at a bottom base surface of the top base plate.

4. The satellite dish mount device of claim 1 wherein the connecting member is attached to the cable receiving member and the strain relief fitting member is attached to the connecting member.

5. The satellite dish mount device of claim 1 wherein the base mount block assembly equally distributes the weight of the dish base plate of the satellite dish to the rooftop.

6. The satellite dish mount device of claim 1 wherein the flashing includes a bottom surface attached to the rooftop and a top surface includes the cable receiving member, the base mount block assembly and a plurality of drip diverters.

7. The satellite dish mount device of claim 6 wherein the plurality of drip diverters diverts water falling at the top surface of the flashing towards the rooftop thereby preventing water leakage at the cable riser assembly and into a structure.

8. The satellite dish mount device of claim 1 wherein the flashing includes a plurality of flashing connecting holes adaptable to connect the flashing to the rooftop.

9. The satellite dish mount device of claim 1 wherein the top base plate includes a plurality of first rafter bolt holes and a plurality of dish holes positioned at a top base surface thereon.

10. The satellite dish mount device of claim 1 wherein the block member includes a plurality of second rafter bolt holes positioned on a top block surface thereon.

11. The satellite dish mount device of claim 1 wherein the plurality of fins are adaptable to distribute the weight of the dish base plate equally over each side of at least one roof rafter at the rooftop.

12. The satellite dish mount device of claim 1 wherein the dish base plate of the satellite dish is engaged with the top base plate utilizing a plurality of threaded bolts inserted through the plurality of dish holes and a plurality of dish base holes at the dish base plate.

13. The satellite dish mount device of claim 1 wherein the base mount block assembly attaches to the rooftop by inserting a plurality of rafter bolts through the plurality of first rafter bolt holes aligned with the plurality of second rafter bolt holes at the block member.

14. The satellite dish mount device of claim 1 wherein the top base plate has an extruded portion that defines a notch for a course of roofing shingles located at the rooftop.

15. A satellite dish mount for firmly attaching a satellite dish to a roof top and providing a point of entry for a cable, the dish mount comprising:
   a flashing attached to a rooftop, the flashing comprising a plurality of drip diverters and a cable receiving member for receiving and passing a cable through the rooftop;
   a base mount block assembly integrated to the top surface of the flashing and including a block member and a top base plate adaptable to mount a dish base plate of a satellite dish thereon, the top base plate including a plurality of fins, a portion of which being designed to slide through a groove at the block member thereby engaging the top base plate with the block member preventing vertical movement of the top base plate relative to the block member; and
   a cable riser assembly having a strain relief fitting member and a connecting member, the cable riser assembly enabling the cable to pass therethrough, and further providing a drip curve arrangement to the cable providing water proof protection to the cable riser assembly and to the rooftop;
   whereby the cable riser assembly provides water proof protection to the cable riser assembly and the rooftop.

16. The satellite dish mount device of claim 15 wherein the base mount block assembly distributes the weight of the dish base plate of the satellite dish to the rooftop.

17. The satellite dish mount device of claim 15 wherein the plurality of fins are positioned at a bottom base surface thereon.

18. The satellite dish mount device of claim 15 wherein the flashing includes a bottom surface attached to the rooftop and a top surface includes the cable receiving member, the base mount block assembly and a plurality of drip diverters.

19. The satellite dish mount device of claim 18 wherein the plurality of drip diverters diverts water falling at the top surface of the flashing towards the rooftop thereby preventing water leakage at the cable riser assembly and into a structure.

* * * * *